June 13, 1939.    L. B. BLACK    2,162,602
INCLINATION GAUGE
Filed Dec. 27, 1938
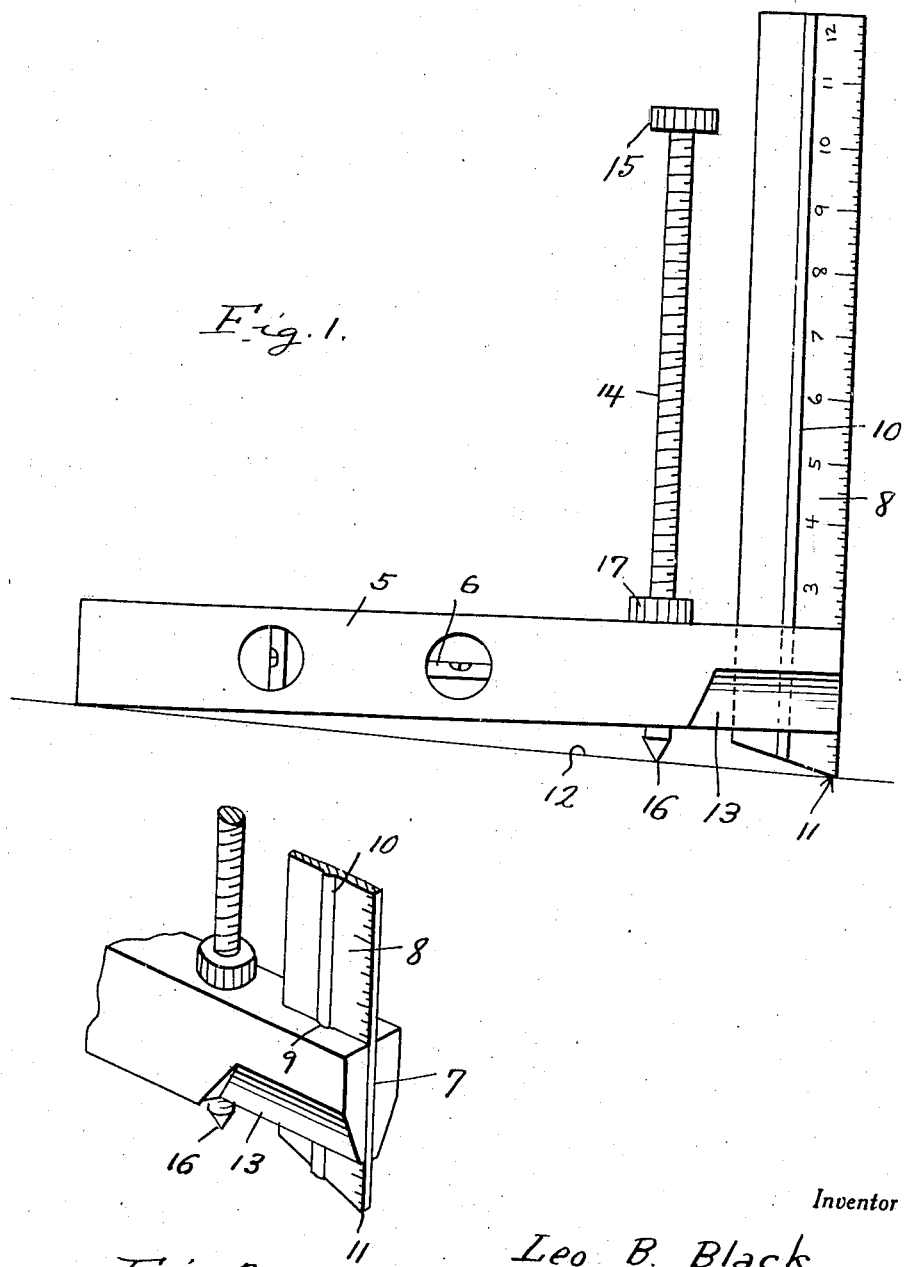
Inventor
Leo B. Black
By Clarence A. O'Brien
and Hyman Berman
Attorneys Patented June 13, 1939

2,162,602

UNITED STATES PATENT OFFICE 2,162,602

INCLINATION GAUGE

Leo B. Black, Denver, Colo.

Application December 27, 1938, Serial No. 247,905

3 Claims. (Cl. 33—89)

The present invention relates to gauges to determine the inclination of roofs and other inclined surfaces and has for its primary object to provide a ruler attachment for spirit levels in which the ruler is positioned at right angles at one end of the level and provided with a pointed end for contacting engagement with the surface of the roof or other object whereby to measure the inclination of the roof.

A further object is to provide an inclination gauge attachment for spirit levels embodying an adjusting screw threaded through the level for supporting one end thereof to permit the proper adjustment of the ruler to obtain an accurate measurement of the inclination of the object upon which the device is positioned.

A still further object is to provide a device of this character of simple and practical construction, which is efficient and reliable in use, relatively inexpensive to manufacture and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which Figure 1 is a side elevational view showing the device in use, and Figure 2 is a fragmentary perspective view of the end of the spirit level to which the ruler is slidably attached.

Referring now to the drawing in detail, the numeral 5 designates a spirit level which includes the usual liquid tubes 6, one end of the level having a transverse slit 7 formed therein adapted to slidably accommodate a flat ruler 8 for positioning the ruler at right angles to the level as clearly shown in Figure 1 of the drawing.

One wall of the slit 7 is formed with a channel 9 adapted to accommodate a rib 10 extending longitudinally on one surface of the ruler to maintain the ruler and level in a true right angle position relative to each other.

One end of the ruler is inclined to provide a pointed edge 11 to provide a sharp contact with the inclined surface 12 of a roof or other structure when the tool is positioned as shown in Figure 1 of the drawing to determine the number of inches of inclination per foot of surface.

In order to facilitate the reading of the scale on the ruler the bottom edge of the level is beveled as shown at 13 adjacent the end provided with the slit portion 7.

A screw 14 is threaded through the level and is provided with a manipulating knob 15 at one end while its opposite end is pointed as shown at 16 to provide a sharp contact with the roof surface to support the adjacent end of the level after the ruler has been adjusted to measure the extent of inclination and a lock nut 17 is provided for the screw to secure the latter in its fixed position of adjustment.

It is believed the details of construction and manner of use of the tool will be readily understood from the foregoing without further detailed explanation.

Having thus described the invention, what I claim is—

1. An inclination gauge comprising in combination a spirit level having a transverse split formed in one end, a ruler slidably mounted in said split end of the level, means for securing the ruler at a right angle position to the level in said split portion, the lower end of the ruler being pointed and means for adjustably securing the split end of the level in an elevated position.

2. An inclination gauge comprising in combination a spirit level having a transverse split formed in one end, a ruler slidably positioned in said split, means for maintaining the ruler at right angles to the level during slidable adjustment of the ruler and means for supporting the end of the level adjacent the ruler in an elevated position.

3. An inclination gauge comprising in combination a spirit level having a transverse split formed in one end, one wall of said split portion having a groove therein, a ruler slidably positioned in said split and a rib on the ruler seated in the groove to maintain the ruler at right angles with respect to the level, said ruler also having a pointed end to provide a sharp contact with the surface of a structure to be measured and a set screw threaded through the level parallel to the ruler to support the adjacent end of the level at a predetermined fixed elevated position above said surface.

LEO B. BLACK.